June 9, 1925.

B. M. ELY 1,541,488

GRINDING BURR

Filed June 25, 1924

2 Sheets-Sheet 1

Inventor:
Bernard M. Ely,
By Dynenforth, Lee, Chritton & Wiles,
Attys

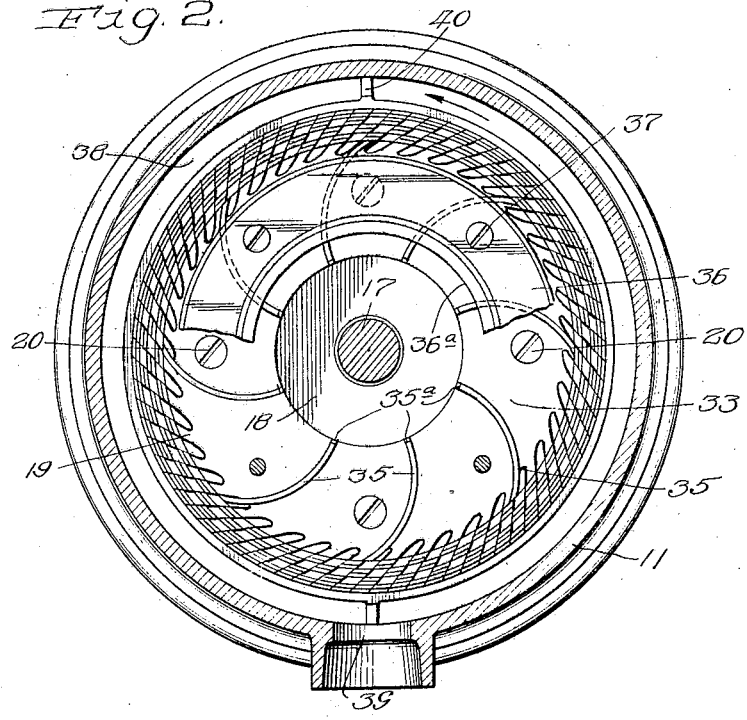
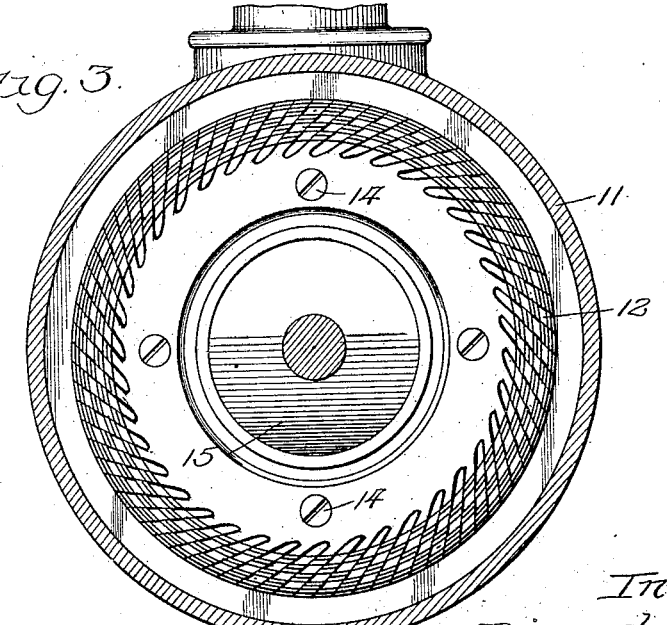

Patented June 9, 1925.

1,541,488

UNITED STATES PATENT OFFICE.

BERNARD M. ELY, OF MARSHALL, MICHIGAN, ASSIGNOR TO LAMBERT MACHINE COMPANY, OF MARSHALL, MICHIGAN, A CORPORATION OF MICHIGAN.

GRINDING BURR.

Application filed June 25, 1924. Serial No. 722,286.

*To all whom it may concern:*

Be it known that I, BERNARD M. ELY, a citizen of the United States, residing at Marshall, in the county of Calhoun and State of Michigan, have invented a new and useful Improvement in Grinding Burrs, of which the following is a specification.

This invention relates to improvements in grinding burrs and is here shown as embodied in a device especially adapted for the reduction of roasted coffee berries, previously broken. The grinding burrs are adapted to reduce such broken coffee berries into various uniform grades of fineness as may be desired.

By the use of my invention, the broken coffee berries are cut rather than crushed. By the use of my invention, it is possible to produce very fine, steel cut, coffee of a uniform grade.

Although the invention is here shown as embodied in a device especially adapted for grinding coffee which has been previously broken to a certain extent, it is evident that, without detracting from the spirit of the invention, the same may be used for grinding or cutting whole coffee berries, and may be used for cutting or grinding other cereals and substances.

Figure 1:
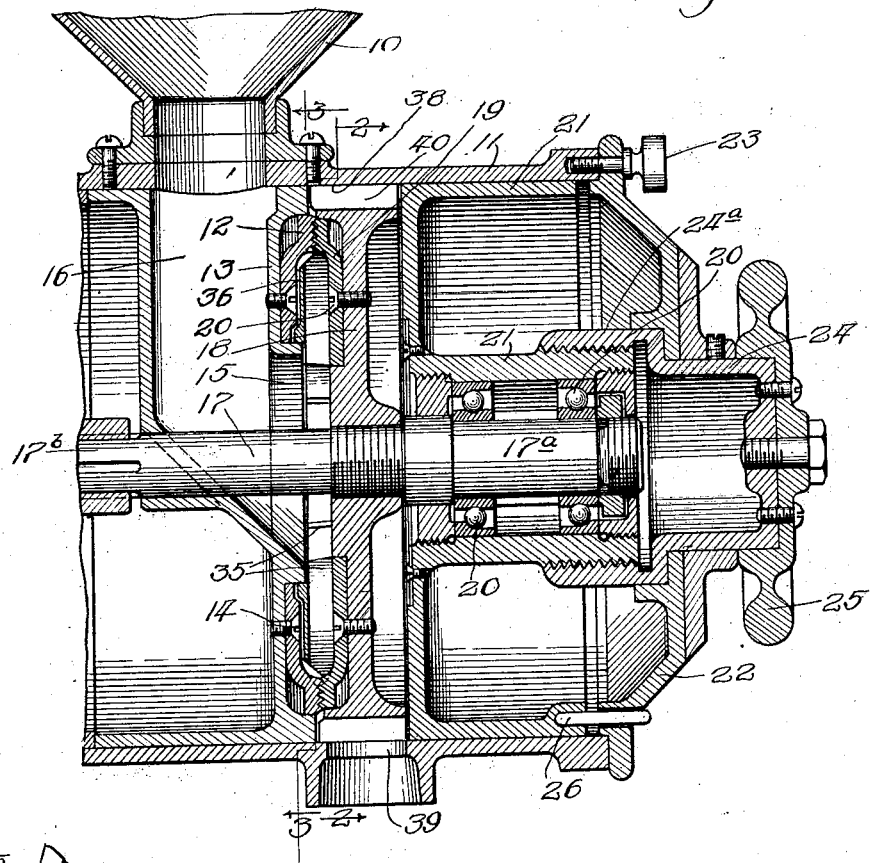
Figure 4:
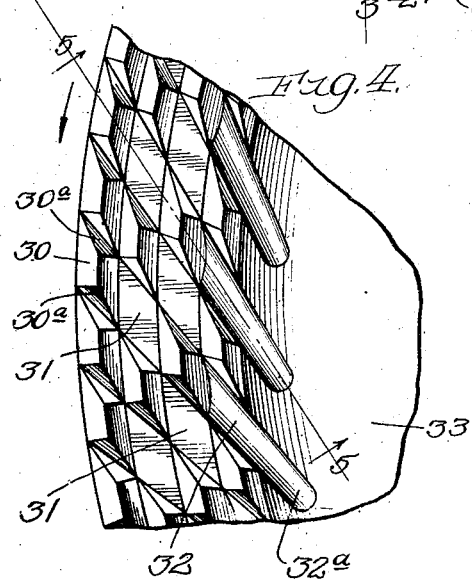
Figure 5:
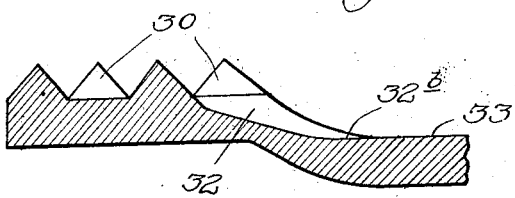

In that form of device embodying the features of my invention shown in the accompanying drawings, Figure 1 is a view in vertical cross section, Fig. 2 is a view as indicated by the line 2—2 of Fig. 1, Fig. 3 is a view taken as indicated by the line 3—3 of Fig. 1, Fig. 4 is a view on an enlarged scale of a portion of the peripheral surface of the runner burr showing the teeth thereon, and Fig. 5 is a view taken as indicated by the line 5—5 of Fig. 4.

As shown in the drawings, 10 indicates a suitable hopper in which the coffee or other material to be ground is fed in any suitable manner. In the event that coffee is to be ground, the berries are preferably broken to a certain extent before being ground. 11 indicates a substantially cylindrical housing in which the grinding burrs are suitably mounted. 12 indicates a stationary burr which is supported in the housing 11. This burr will be seen most clearly in Fig. 3. It is to be noted that it is firmly attached to the circular web 13 in the housing 11 by means of the screws 14. The burr 12 is provided with a central recess 15 through which the coffee is fed from the hopper 10, being directed thereto by the passageway 16.

Centrally arranged within the cylindrical casing 11 is a shaft 17 carrying a circular disk 18 on which is mounted the runner burr 19 by means of the screws 20. The runner burr is best shown in Fig. 2, the direction of rotation being indicated by the arrow. Rotation is imparted to the shaft 17 by any suitable means, not shown.

Any suitable means is provided for adjusting the two disks toward or away from each other in order to vary the grade of fineness to which the material is to be cut. This adjustment, in the device here shown, is accomplished in the following manner. The shaft 17 is extended beyond the disk 18 as indicated by 17$^a$. The end 17$^a$ of the shaft is supported by suitable ball bearings 20 in a cylindrical member 21 mounted within the cylindrical casing 11. Mounted on the end of the casing 11 is a cover 22 held in place by means of the thumb screw 23. The cover 22 supports a sleeve 24 adapted to be rotated by the hand wheel 25. The inner end of the sleeve 24 as indicated by 24$^a$ is provided with internal threads engaging external threads on the central part of the member 21. The member 21 is prevented from rotating by means of the pin 26 but this pin permits it to slide inwardly and outwardly in the casing 11. By this construction, rotation of the hand wheel 25 serves to draw the member 21 inwardly or outwardly. This movement being transmitted through the bearings 20 also pulls the shaft 17 carrying the disk 18 and runner burr 19 inwardly or outwardly thus moving the runner burr 19 closer to or farther away from the stationary burr 12. The other end of the shaft as indicated by 17$^b$ is squared in order to permit its engagement by a square collar (not shown) so that it may be rotated and still permit the adjustment of the disks above referred to.

I will now describe more in detail the particular construction of the burrs themselves. The runner burr (best shown in Figs. 2, 4 and 5) is provided at its periphery with four concentric circular rows of teeth. Each tooth is prismatic in shape with its ends beveled. In Fig. 4 one of these teeth is indicated by the reference numeral 30, the beveled ends being indicated by 30ª. The outer row of teeth is uninterrupted. Each of the second and third rows from the periphery, however, has each alternate tooth removed, thus leaving between each two teeth a flat or plain surface 31 having an area substantially the same as the area of the base of a tooth. The fourth row from the periphery also has alternate teeth removed but instead of leaving a flat or plain surface between each two teeth, there is formed a groove 32 which extends inwardly as indicated by 32ª beyond the inner row of teeth. The bottoms of the grooves 32 at their inner ends as indicated by 32ᵇ terminate flush with the surface 33 of the burr itself. It is to be noted that the face of the burr inside of the rows of teeth, as indicated by 33, is depressed or sunken below the bases of the teeth 30. The bottoms of the grooves 32 have their outer ends substantially flush or on a level with the bases of the teeth 30 and their inner ends on a level with the central face 33 of the burr. This construction is most clearly shown in Figs. 4 and 5. The teeth in the second, third and fourth rows (counting from the periphery) are in staggered relation. The stationary burr is provided with teeth formed similar to those on the runner burr. The rows of teeth on the runner burr are slightly smaller than the corresponding rows of teeth on the stationary burr so that the rows of teeth on the two burrs will interlock when the burrs are in grinding relation. That is, the outer row of teeth on the runner burr lies between the outer row and the second row on the stationary burr. The second row from the outside on the runner burr lies between the second and third rows from the outside on the stationary burr, and so on. If desired, the rows of teeth could be formed to interlock in another way by having the rows on runner burr correspondingly larger than those on the stationary burr. It is to be noted that adjacent teeth in different rows do not lie on radial lines but slant somewhat toward the tangent. In other words, a line drawn through adjacent teeth, in the different rows (such as the section line 5—5) will form an angle with a radial line.

In Fig. 4 the direction of rotation of the burr is shown by the arrow, and it will be noted that a line drawn through adjacent teeth in the different circular rows slants away from a radius toward the direction of rotation as such line is projected inwardly from the periphery of the burr. The grooves 32 likewise are extended inwardly in line with adjacent teeth in the different rows. The runner burr 19 also carries eight circular feeders or baffles 35 forming pockets therebetween. The inner ends of the feeders 35, as indicated by 35ª, terminate some distance from the shaft 17. Lying over the feeders 35 is a circular plate 36 held in place by means of the screws 37. The outer edge of the plate 36 lies just inside of the inner row of teeth. The inner edge of the plate 36, as indicated by 36ª, lies just outside of the inner ends 35ª of the feeders 35. In other words, the feeders 35 are virtually thin curved partitions lying between the face 33 of the burr and the plate 36, thus forming pockets therebetween. Each of the feeders 35 is curved backwardly toward the direction of rotation from its inner end to its outer end, so that upon rotation of the burr, such feeders will tend to force material in the pockets outwardly to the teeth.

In the operation of the device, material is fed from the hopper 10 through the passage 16 thence through the circular opening 15 where it passes through the opening in the circular plate 36. The material then meets the disk 18 and drops into the pockets between the feeders 35. The shape of the feeders 35 and rotation of the disk assisted by gravity and centrifugal force, forces the material outwardly and between the teeth of the two burrs. The grooves 32 serve to assist in feeding of material to the outer rows of teeth. After the material has been ground by the teeth it escapes into the annular space 38 outside of the disk 18 and thence finds an outlet through the opening 39. The disk 18 is also provided with two diametrically arranged wipers 40 to move the material around in the annular space 38 until it finds an exit through the opening 39.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A grinding burr provided at its periphery with concentric rows of teeth, the central portion of the face of the burr inside of the inner row of said teeth being flat and depressed below the level of the base of said teeth, and a series of inwardly extending grooves in the face of the burr having their outer ends lying between the teeth of the inner row, the bottoms of said grooves at their outer ends being substantially on a level with the base of the teeth and at their inner ends substantially on a level with the depressed central portion of the face of the burr.

2. A stationary burr and a runner burr, said burrs having on their peripheries interlocking concentric rows of teeth, the central portions of the faces of said burrs inside of said teeth being separated, a plurality of radial baffles or feeders on the runner burr having their outer ends terminating near the teeth, and a flat circular plate lying on top of said baffles or feeders.

3. A stationary burr and a runner burr, said burrs having on their peripheries interlocking concentric rows of teeth, the central portions of the faces of said burrs inside of said teeth being separated, a plurality of radial baffles or feeders on the runner burr having their outer ends terminating near the teeth, and a flat circular plate lying on top of said baffles or feeders, the outer periphery of said plate lying adjacent the inner row of teeth on the runner burr, and the inner periphery of said plate lying close to the inner ends of said baffles or feeders.

4. A stationary burr and a runner burr, said burrs having on their peripheries interlocking concentric rows of teeth, the central portions of the faces of said burrs inside of said teeth being separated, and a plurality of covered radial pockets on the runner burr having their outer ends lying adjacent the teeth and their inner ends open.

5. A stationary burr and a runner burr, said burrs having on their peripheries interlocking concentric rows of teeth, the central portion of the face of each burr inside of said teeth being flat and depressed below the level of the base of said teeth, a series of inwardly extending grooves in the face of each burr having their outer ends lying between the teeth of the inner row, the bottoms of said grooves at their outer ends being substantially on a level with the base of the teeth and at their inner ends substantially on a level with the depressed central portion of the face of the burr, and a plurality of radial baffles or feeders on the runner burr having their outer ends terminating near the teeth.

6. A stationary burr and a runner burr, said burrs having on their peripheries interlocking concentric rows of teeth, the central portion of the face of each burr inside of said teeth being flat and depressed below the level of the base of said teeth, a series of inwardly extending grooves in the face of each burr having their outer ends lying between the teeth of the inner row, the bottoms of said grooves at their outer ends being substantially on a level with the base of the teeth and at their inner ends substantially on a level with the depressed central portion of the face of the burr, a plurality of radial baffles or feeders on the runner burr having their outer ends terminating near the teeth, and a flat circular plate lying on top of said baffles or feeders.

7. A stationary burr and a runner burr, said burrs having on their peripheries interlocking concentric rows of teeth, the central portion of the face of each burr inside of said teeth being flat and depressed below the level of the base of said teeth, a series of inwardly extending grooves in the face of each burr having their outer ends lying between the teeth of the inner row, the bottoms of said grooves at their outer ends being substantially on a level with the base of the teeth and at their inner ends substantially on a level with the depressed central portion of the face of the burr, and a plurality of radial pockets on the runner burr lying between the depressed central portions of the faces of the burrs, said pockets being open at their inner ends and having their outer ends terminating near said teeth.

8. A stationary burr and a runner burr, said burrs having on their peripheries interlocking concentric rows of teeth, the central portion of the face of each burr inside of the inner row of said teeth being flat and depressed below the level of the base of said teeth, and a plurality of covered radial pockets on the runner burr lying between the depressed central portions of the faces of said burrs, said pockets having their inner ends open and their outer ends terminating near the teeth.

9. A stationary burr and a runner burr, said burrs having on their peripheries interlocking concentric rows of teeth, the central portion of the face of each burr inside of the inner row of said teeth being flat and depressed below the level of the base of said teeth, and a plurality of radial pockets on the runner burr lying between the depressed central portions of the faces of said burrs, said pockets formed by radial baffles or feeders on the runner burr with a circular plate lying on top of said baffles or feeders.

10. A stationary burr and a runner burr, said burrs having on their peripheries interlocking concentric rows of teeth, the central portion of the face of each burr inside of the inner row of said teeth being flat and depressed below the level of the base of said teeth, and a plurality of radial pockets on the runner burr lying between the depressed central portions of the faces of said burrs, said pockets formed by radial baffles or feeders on the runner burr with a circular plate lying on top of said baffles or feeders, said pockets having their inner ends open and their outer ends terminating near said teeth.

Witness my hand and seal this 19th day of June, A. D. 1924.

BERNARD M. ELY. [L. S.]